United States Patent
Fang et al.

(10) Patent No.: US 6,193,135 B1
(45) Date of Patent: Feb. 27, 2001

(54) SYSTEM FOR PROVIDING BACK-LIGHTING OF COMPONENTS DURING FLUXLESS SOLDERING

(75) Inventors: Lu Fang, Whitehall; Brian Dale Pottelger, Reading; Dominic Paul Rinaudo, Blandon; Frederick Arthur Yeagle, Leesport, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/394,983

(22) Filed: Sep. 13, 1999

(51) Int. Cl.[7] .............................. B23K 1/00; B23K 20/14; B23K 31/02; B23K 35/38
(52) U.S. Cl. ........................... 228/105; 228/42; 228/219
(58) Field of Search ...................... 228/105, 216, 228/219, 42, 218, 33

(56) References Cited

U.S. PATENT DOCUMENTS

| | | | |
|---|---|---|---|
| 3,680,200 | 8/1972 | Terrill et al. | 29/500 |
| 4,034,468 | * 7/1977 | Koopman | 29/628 |
| 4,564,135 | * 1/1986 | Barresi et al. | 228/6.2 |
| 4,568,277 | * 2/1986 | MacInnes et al. | 432/120 |
| 4,832,249 | * 5/1989 | Ehler | 228/102 |
| 4,836,434 | * 6/1989 | Takenaka et al. | 228/179 |
| 4,838,476 | * 6/1989 | Rahn | 228/180.1 |
| 4,921,157 | 5/1990 | Dishon et al. | 228/124 |
| 4,979,664 | * 12/1990 | Lyons et al. | 228/180.2 |
| 5,139,193 | 8/1992 | Todd | 228/180.2 |
| 5,227,604 | 7/1993 | Freedman | 219/121.63 |
| 5,255,840 | 10/1993 | Nowotarski | 228/254 |
| 5,265,788 | * 11/1993 | Ozawa et al. | 228/42 |
| 5,364,007 | * 11/1994 | Jacobs et al. | 228/42 |
| 5,407,121 | 4/1995 | Koopman et al. | 228/206 |
| 5,426,202 | * 6/1995 | Miura | 437/209 |
| 5,427,303 | 6/1995 | Nowotarski | 228/180.22 |
| 5,499,754 | 3/1996 | Bobbio et al. | 228/42 |
| 5,560,531 | * 10/1996 | Ruszowski | 228/19 |
| 5,604,831 | 2/1997 | Dittman et al. | 385/88 |
| 5,735,451 | * 4/1998 | Mori et al. | 228/206 |
| 5,785,237 | * 7/1998 | Lasto et al. | 228/180.22 |
| 5,801,825 | * 9/1998 | Nutter et al. | 356/241 |
| 5,829,665 | 11/1998 | Yoneyama et al. | 228/124.1 |
| 5,852,257 | 12/1998 | Dittman et al. | 174/59 |
| 5,858,312 | * 1/1999 | Sindzingre et al. | 422/186.04 |
| 5,881,193 | 3/1999 | Anigbo et al. | 385/93 |

* cited by examiner

*Primary Examiner*—Patrick Ryan
*Assistant Examiner*—Kiley Stoner
(74) *Attorney, Agent, or Firm*—Duane, Morris & Heckscher LLP (57) ABSTRACT

An apparatus for performing fluxless soldering includes an enclosure having a gas inlet through which an inert gas is introduced to create an inert gas-rich environment. Components are placed in the enclosure via an access port which also functions as a vent for allowing purge gases to vent from the enclosure. In one embodiment, a heating stage is provided in the enclosure which provides sufficient heat to reflow solder provided between two or more components. The inert gas is constantly flowing, or purging the enclosure in order to displace oxygen that would initially be present in the system. The presence of inert gas exclusive of other materials provides an oxygen-free environment, i.e., the inert gases provide a "shield" or environment around the parts to be soldered to inhibit the formation of additional oxides during soldering. The apparatus may also include an optics holder for transmitting light from an external light source into the enclosure, to permit visual alignment of component parts.

7 Claims, 8 Drawing Sheets

SYSTEM FOR PROVIDING BACK-LIGHTING OF COMPONENTS DURING FLUXLESS SOLDERING

FIELD OF THE INVENTION

The present invention relates generally to soldering methods for electronic devices, and more particularly to methods of fluxless soldering.

BACKGROUND OF THE INVENTION

During a typical solder operation, typically two (2) components are mechanically attached to each other with a metal material called solder. The process requires that the components are placed together with the solder placed in the area where the attachment is to occur. The components are heated to a temperature to melt (reflow) the solder. When the solder melts the liquid solder attaches metallurgically to the components. Liquid solder (like all metals) instantaneously forms an oxide. Oxide layers form on the exterior of the solder forming a "crust" or film which in some cases is very difficult to penetrate or break. If the oxide layer is not removed or broken the solder joint will be very poor. The components and solder are cooled to a temperature below which the solder solidifies, thus creating a solder joint.

Typically, soldering processes include three basic steps: (1) pre-cleaning and deoxidation of surface oxides; (2) solder reflow and/or reflow joining; and (3) post-soldering cleaning. Different flux materials are used in the pre-cleaning step to prepare the surfaces for the soldering step by removal of contaminants and metal oxides from the solder surface (flux is a chemical formulated to remove oxides and prevent oxidation prior or during the soldering process). For example, activated fluxes, such as zinc, ammonium chloride, mineral acid-containing materials, and the like, are typically used in "coarse" soldering applications, e.g., repairing coarse wiring in motors or houses. The solder joining step can occur only after the oxide coating is removed because the high melting point oxides prevent wetting of the two surfaces to be joined by reflow of solder. The third step, post-soldering cleaning, removes flux residue remaining after the reflow.

Highly acidic fluxes are used for the soldering of aluminum layers. Aluminum has a tenacious oxide layer which is chemically very inert and difficult to remove. Thus, mild rosin fluxes are ineffective with aluminum and special fluxes containing acid compounds which are highly corrosive, such as inorganic acids in a cadmium fluoroborate vehicle, must be used. Fluxes used with aluminum can also contain metal chlorides, fluorides, and ammonium compounds.

Because of the gross corrosive nature of these fluxes, and the high attack rates on metals in microelectronic assemblies, such fluxes cannot be used in microelectronics. For microelectronic devices, the standard practice is to reduce the acid activity of the flux to a mildly activated or non-activated grade in an attempt to minimize the adverse effects of the flux on the components. Typical soldering processes for copper layers in microelectronic applications use rosins which form a very mild organic acid when melted at the soldering temperature but which are relatively inert at room temperature.

Although corrosion and other risks can be minimized in copper soldering applications using mild flux agents, flux is necessary to keep the solder from oxidizing, allow it to flow and wet the parts being soldered. In addition, with the shrinking size of all electronic components and bonding pads, the rapidly growing use of surface mount technology, and the increasing demand for flip-chip device bonding, the post reflow cleaning of flux residues is becoming increasingly difficult. The small gaps between assembled parts, and solidification cavities in mixed soldered joints are very resistant to penetration by cleaning liquids. Inefficient post-soldering cleaning can reduce the long term reliability of the whole assembly. Further, there can be other problems associated with non-activated or mildly activated flux processes, such as higher defect levels and high rework costs. Optoelectronic devices are also very sensitive to flux residues due to absorption and bending of the optical signals.

In a typical soldering procedure, the flux residue needs to be removed through a cleaning process. Many previous cleaning solvents such as Freon can no longer be used due to environmental concerns. Great efforts have been made to develop replacement solvents but the ultimate solution is to solder without the use of flux, i.e., fluxless soldering. Fluxless soldering is a method of soldering components together using a variety of different solders without the use of a flux.

An exemplary method to perform fluxless soldering typically involves a mechanical "scrubbing" of the components after the solder has melted to mechanically break the oxide on the solder. This method can be fixture-intensive, mechanically stresses the components, and provides a marginal solder joint. Another method is the use of batch-type equipment such as a DAP furnace which requires the components to be assembled or fixtured and then placed into a chamber which is sealed, evacuated, and back-filled with an inert (oxygen-free) gas. The assemblies are heated and cooled and then removed from the chamber. This method is usually capital and floor space intensive, as well as a batch operation.

SUMMARY OF THE INVENTION

An apparatus for performing fluxless soldering in accordance with the invention includes an enclosure that can be saturated with an inert gas, and an optics holder which is coupled to the enclosure for transmitting light into the enclosure from an external light source.

In one embodiment of the invention, the optics holder is engageable with a fiber optic cable which transmits light from an external light source to the optics holder. The optics holder includes a mirror mounted inside the enclosure for reflecting light transmitted into the enclosure through the optics holder.

BRIEF DESCRIPTION OF THE DRAWINGS

Other objects, advantages and novel features of the invention will become more apparent from the following detailed description of the invention when considered in conjunction with the accompanying drawings wherein.

DESCRIPTION OF THE PREFERRED EMBODIMENTS

Referring now to the drawings wherein like characters designate like parts in each of the respective drawings, FIGS. 1 through 4 show a system 5 for creating fluxless solder joints which generally includes a base 14 and a removable cylindrical cover 11 which together define a cavity 15 that may be saturated with an inert gas such as nitrogen, helium or argon to provide an environment suitable for performing fluxless soldering without the formation of "additional" oxides at the solder joint.

The phrase "additional oxides" is used herein in recognition of the fact that the components may have oxides on them before being placed in the enclosure. However, in embodiments of the invention, no additional oxides are formed during the soldering process.

In the exemplary embodiment, base 14 is a machined stainless steel structure which includes a rectangular mounting plate 18 and a vertically protruding cylindrical member 22. The cylindrical member 22 includes an upper portion 26 and a lower portion 28, wherein the upper portion 26 has a diameter that is less than the diameter of the lower portion 28. An annular flange 30 is integrally formed on the upper portion 26 and is axially spaced apart from lower portion 28, whereby flange 30 and lower portion 28 together define an annular space 24. The lower portion 28 of the cylindrical member 22 includes an inlet orifice 10 that communicates with annular space 24. The inlet orifice 10 can be coupled to an external gas source (not shown) for supplying an inert gas to the system. A plurality of orifices 32 provided in flange 30 serve as a conduit for conveying gas from annular opening 24 to the main cavity 15. The mounting plate 18 may include a plurality vertically oriented through holes 20 for mounting the base 14 to another structure. Although the exemplary base and cover 11 are cylindrical, the base and cover may have a variety of shapes, including, but not limited to enclosures having three or more rectangular sides and truncated pyramids having three or more sides.

A heating stage 16 is mounted on the top of cylindrical member 22. The heating stage 16 provides heat sufficient to effect reflow soldering of parts placed in the cavity of the system. In the exemplary embodiment, heating stage 16 is a resistive heating element formed of copper tungsten other types of heating elements may also be used. The heating stage 16 is mounted to a post 34 extending from the top of the upper portion 26 of cylindrical member 22. A mounting pedestal 36 is formed at the top of post 34 for the placement of components 8 that are to be soldered.

Exemplary cover 11 is a thinned walled metal tube having one open end, and a removable disk-shaped lid 12 secured to the end opposite the open end. The cover 11 slips over the cylindrical member 22 extending past the peripheral edge of flange 30 to at least partially receive the lower portion 28 of cylindrical member 22. The cover 11 is secured to base 14 by one or more fasteners which can securely anchor the cover 11 to the base 14 while permitting later disassembly, and is preferably secured to the base by a pair of screws (not shown).

When engaged with base 14, the cover 11 houses the heating stage 16 along with pedestal 36, and together with base 11 forms an enclosure which can be supplied with an inert gas to provide a shielded environment for performing fluxless soldering. A through hole or chimney 13 is provided in the lid 12. The chimney 13 provides an outlet that allows purge gases to vent from the cavity 15, and also functions as an access port for placing component parts in the cavity 15 for soldering. The cover 11 fits snugly around flange 30 and the lower portion 28 of member 22 to substantially seal off annular opening 24, so that any gas introduced into opening 24 via inlet orifice 10 passes through the flange orifices 32 and into the main cavity 15 of the assembly. The cover 11 engages the base 14 to provide a generally gas tight seal; however, insofar as inert gas is continuously supplied to the cavity during operation of the system, insignificant amounts of gas leakage at the base of the cap are tolerable.

A vacuum pick up tool 40, can be used to pick up component parts and place them in the cavity 15 of the system via the access port 13. The tool 40 is preferably a cylindrical shape, made of, for example, stainless steel, with a hole in the center for vacuum. The vacuum is used to "pick up" the piece-parts (i.e., the components to be soldered) and transport them to the bond station (i.e., the cavity housing the heating stage 16), which in turn provides the environment of shield gas. The tool 40 can be inserted through chimney 13 to place and remove components in cavity 15. Alternate placement means, including, but not limited to, mechanical and magnetic pick up implements are also contemplated within the scope of the invention.

FIGS. 5 through 8, show a fluxless soldering system that includes an integrated optics holder 50. The optics holder 50 is a device that transmits light from an external light source (not shown) to the interior cavity 15 of the system. When the cavity 15 is illuminated, visual inspection of the cavity 15 is possible, thus allowing accurate alignment of component parts 8. Visual alignment may be achieved in an automated production environment using integrated automated vision software.

In the exemplary embodiment, the optics holder 50 is a machined metal part which is mounted to cover 11. The optics holder 50 receives a fiber optic cable 52 that is coupled to an external light source. Light transmitted via fiber optic cable 52 passes through the optics holder 50, entering the cavity 15 of the system. A mirror 54 is mounted to the optics holder 50, inside cavity 15. The mirror 15 is angled so that the incoming light is reflected in the general direction of the mounting pedestal 36 to illuminate component parts 8 placed thereon.

A system in accordance with the invention is used to form fluxless solder joints as follows. Using a vacuum pick up tool 40, the components to be soldered are inserted into cavity 15 of the assembly through access port 13 and positioned on pedestal 36, one on top of the other. A solder preform is provided on the surface of one of the components, so that when the components are stacked, the solder is sandwiched between them. An inert gas, which may be, for example, nitrogen, argon or helium, is introduced into the assembly, in order to provide a "blanket" or environment of inert gas, substantially devoid of other materials. The gas enters the assembly through the inlet orifice 10, passing through the orifice 10 and into the annular opening 24, and is then diffused as it travels upward (as indicated by the "up" arrows in FIG. 4) and through flange orifices 32 to reach the main cavity 15 of the system. The inert gas is constantly flowing, or purging the cavity in order to displace oxygen that would initially be present in the system and any outgassed substances. The presence of inert gas exclusive of other materials serves to provide an oxygen-free environment, i.e., the inert gas provides a "shield" or environment around the parts to be soldered to inhibit the formation of oxide on the solder during the reflow (heating) process.

While the component parts are shielded by the inert gas provided in the cavity 15, electrical energy is supplied to the heating element 16 to provide sufficient heat to melt the solder and create the solder joint. The heating element 16 is then deactivated, allowing the solder to solidify, after which the soldered parts can be removed from the system, through access port 13, using the pick up tool 40, and the process can be repeated.

Figure 1:
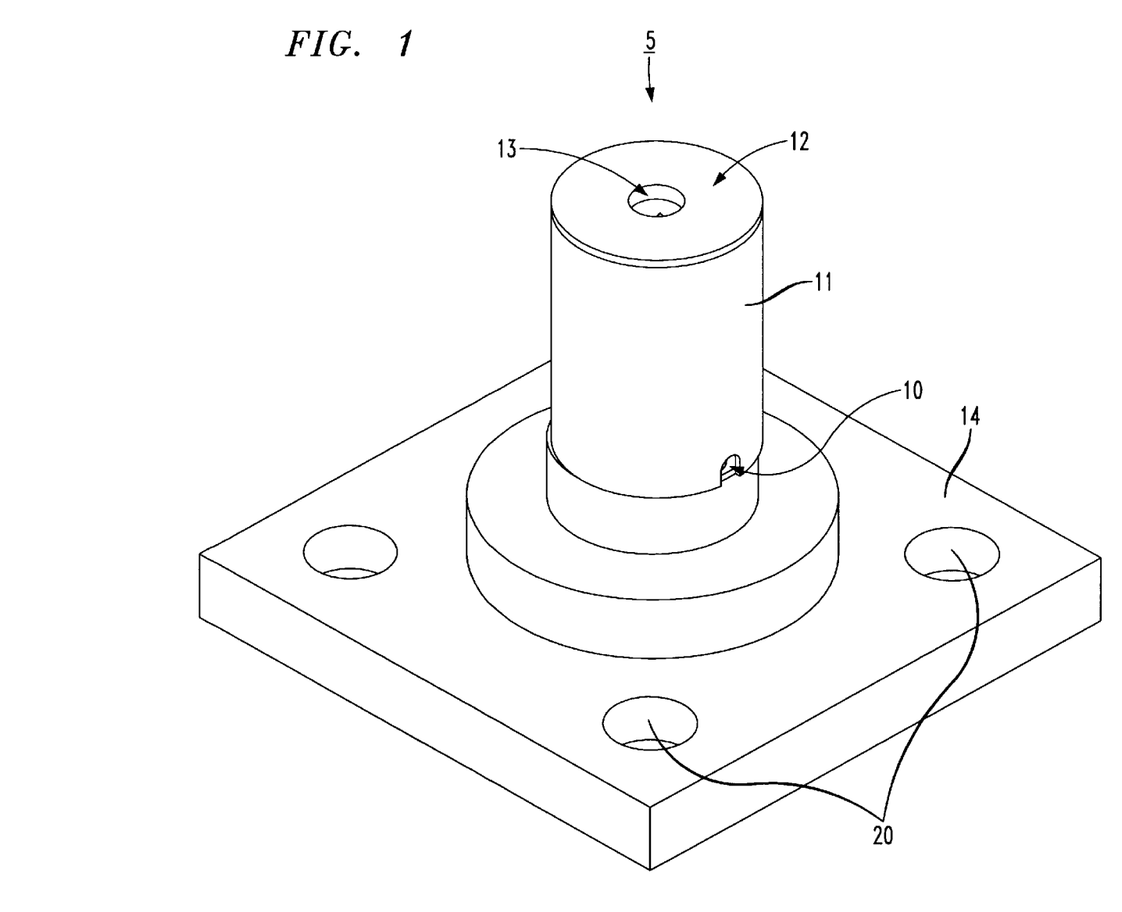
FIG. 1 is an isometric view of the fluxless soldering according to the invention.
Figure 2:
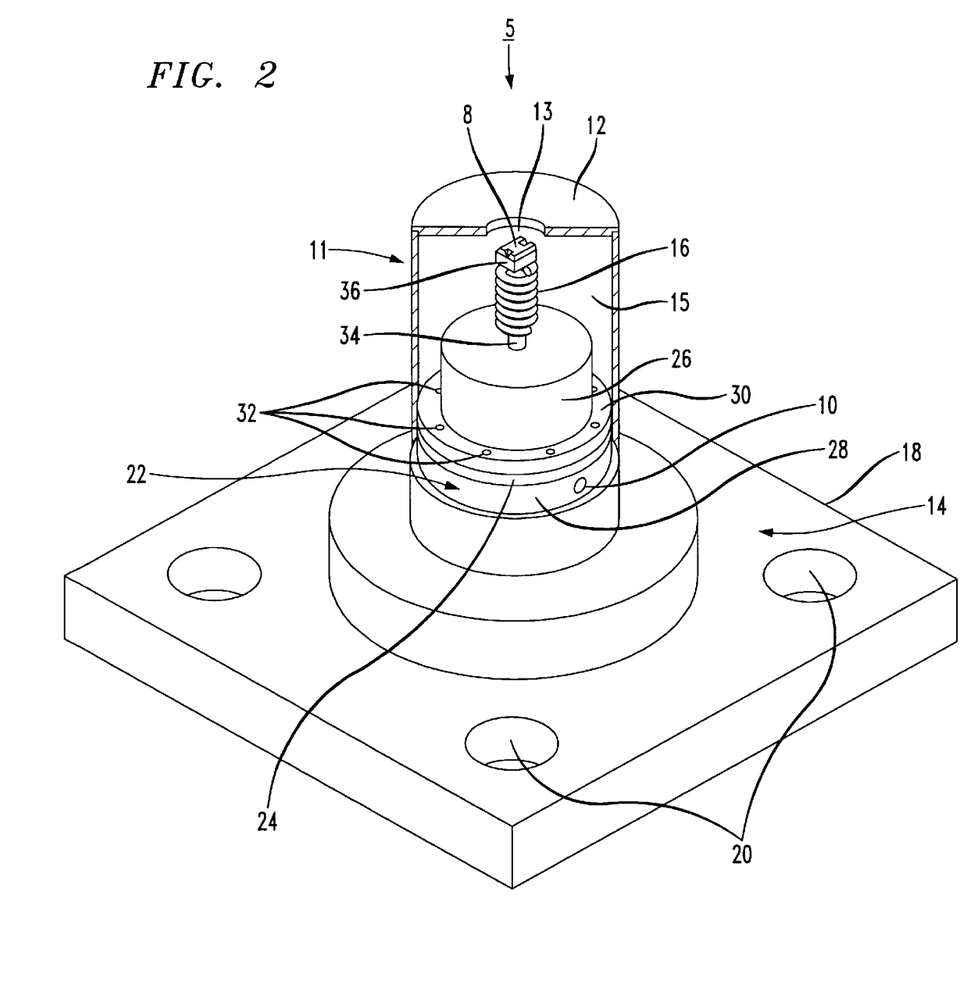
FIG. 2 is an isometric partial cut-away view of cross-sectional view of a fluxless soldering system shown in FIG. 1.
Figure 3:
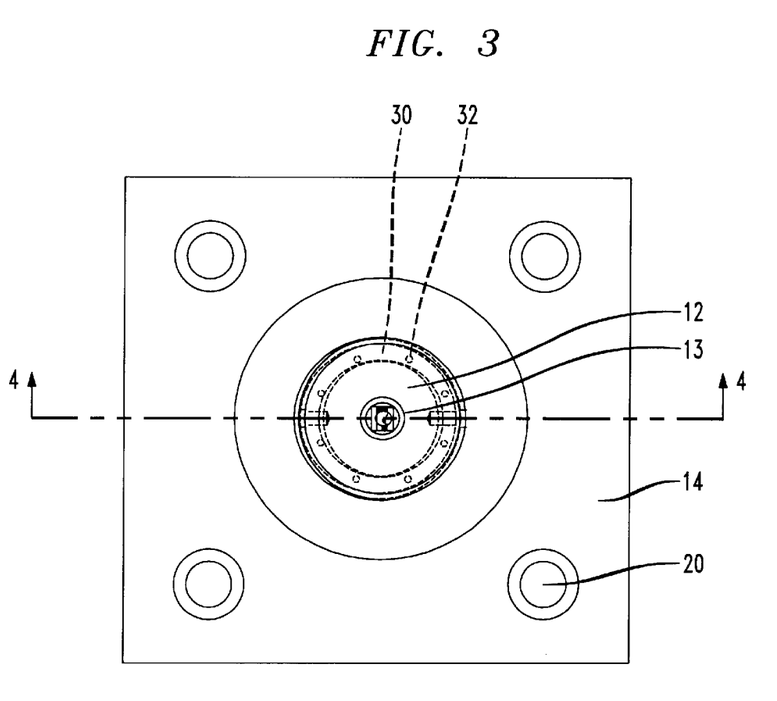
FIG. 3 is a top plan view of the of the fluxless soldering system shown in FIGS. 1 and 2.
Figure 4:
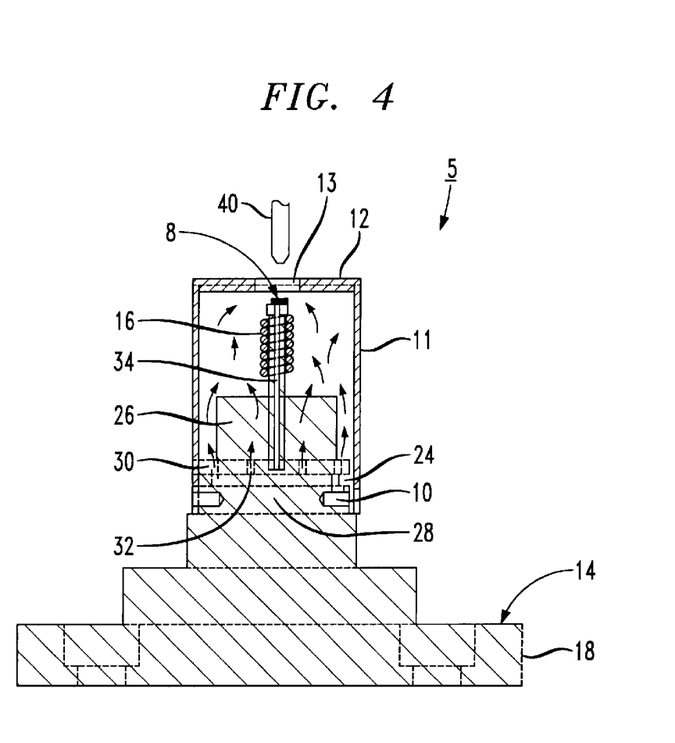
FIG. 4 is cross-sectional view of the fluxless soldering system shown in FIG. 3, taken along line 4—4.
Figure 5:
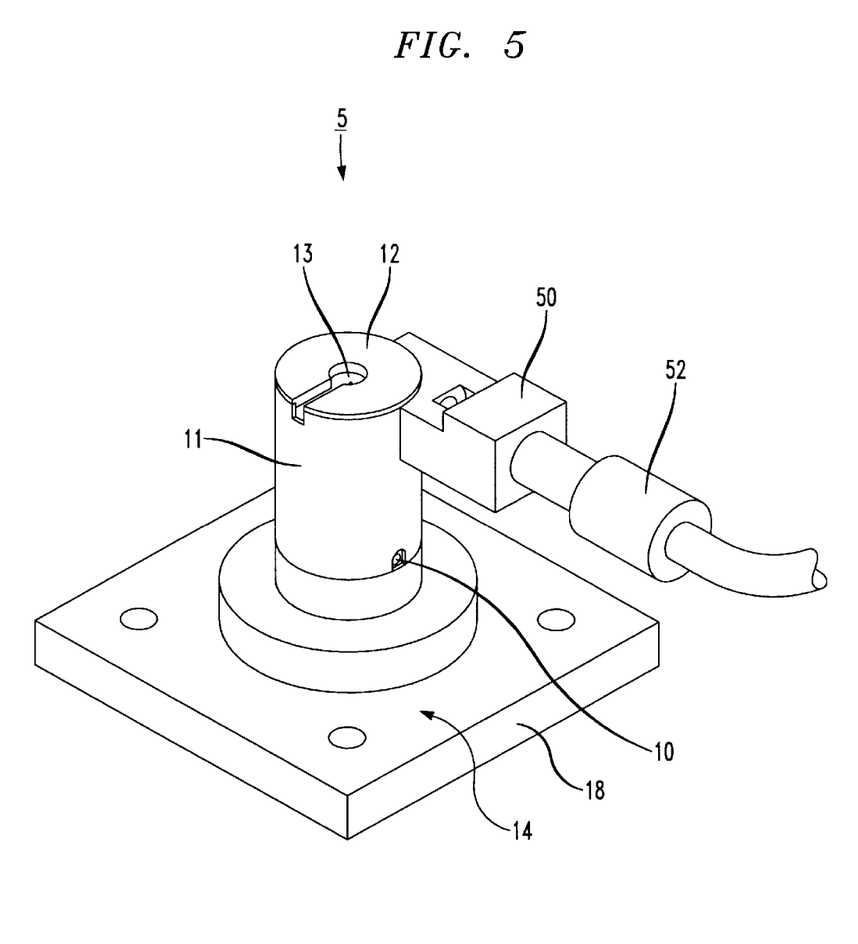
FIG. 5 is an isometric view of the fluxless soldering system, with an integrated optics holder.
Figure 6:
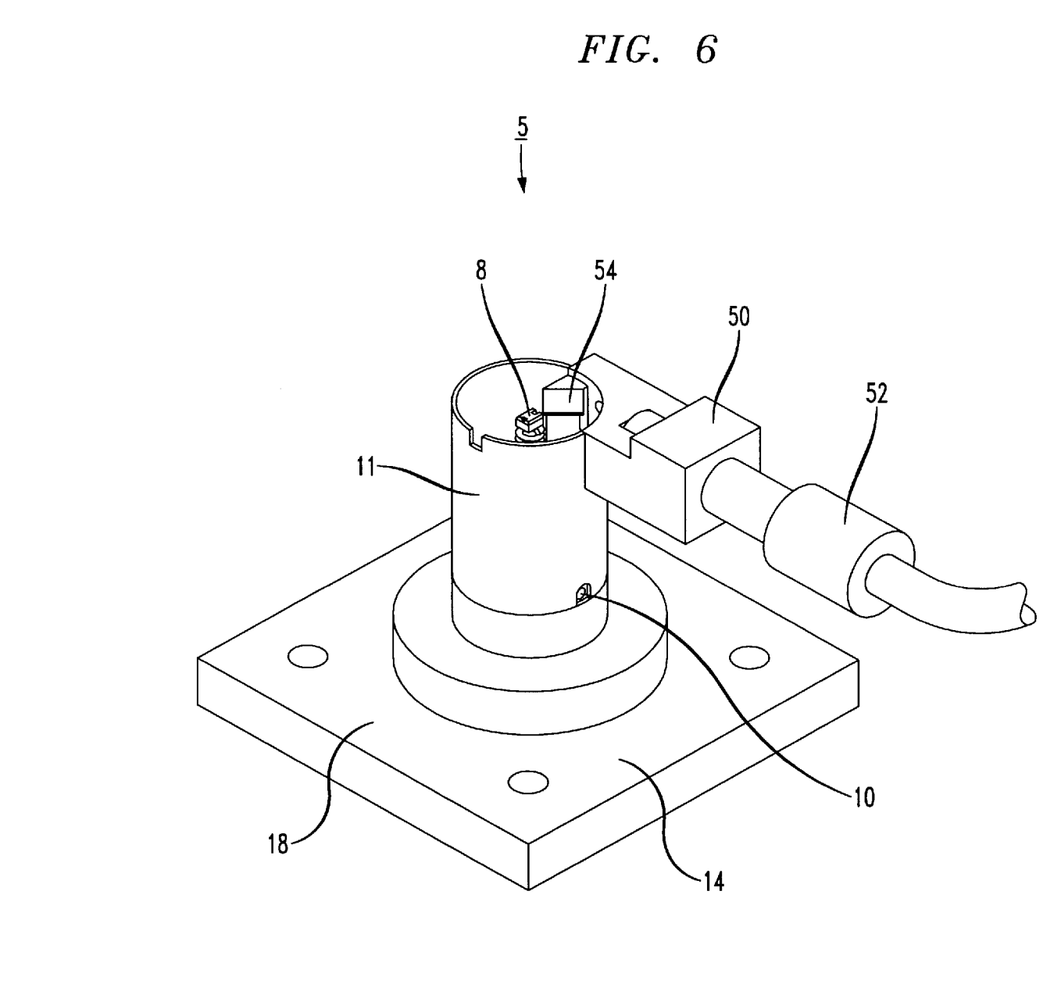
FIG. 6 is an isometric view of the fluxless soldering system of FIG. 5, with the lid removed.
Figure 7:
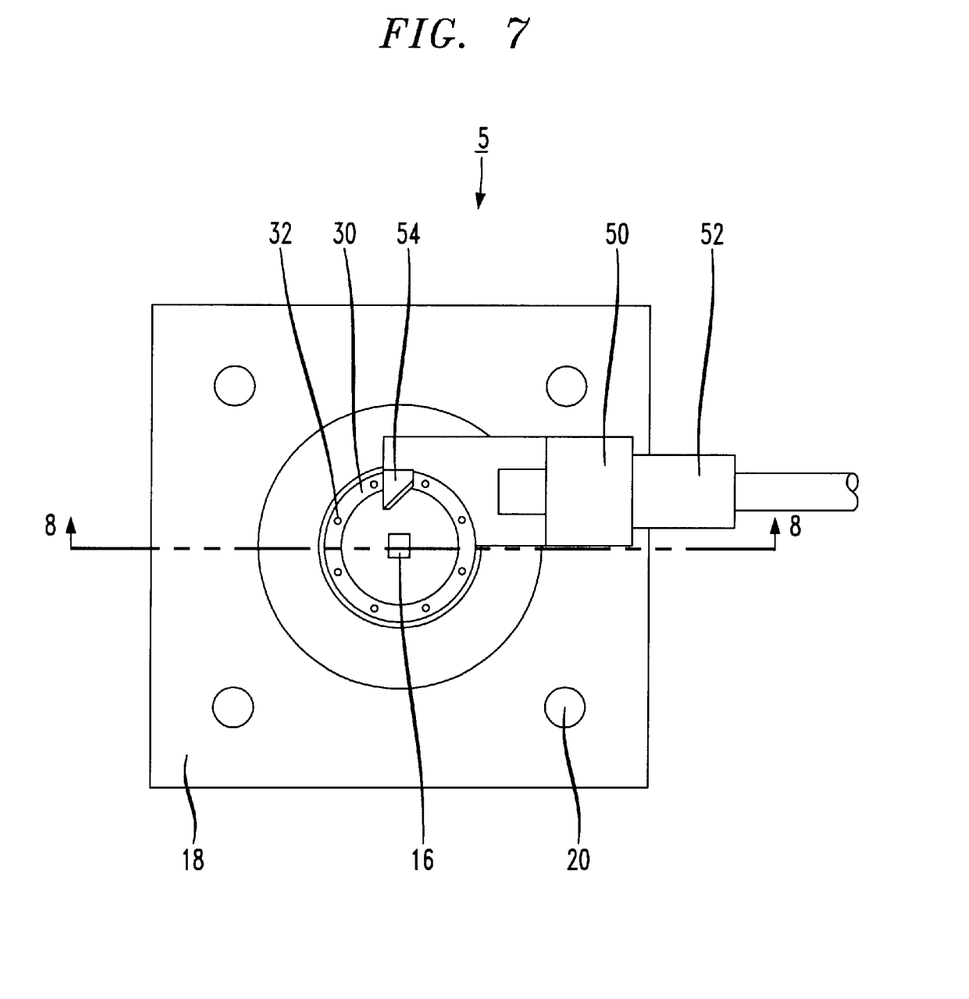
FIG. 7 is a top plan view of the fluxless soldering system with integrated optics holder, shown in FIG. 6.
Figure 8:
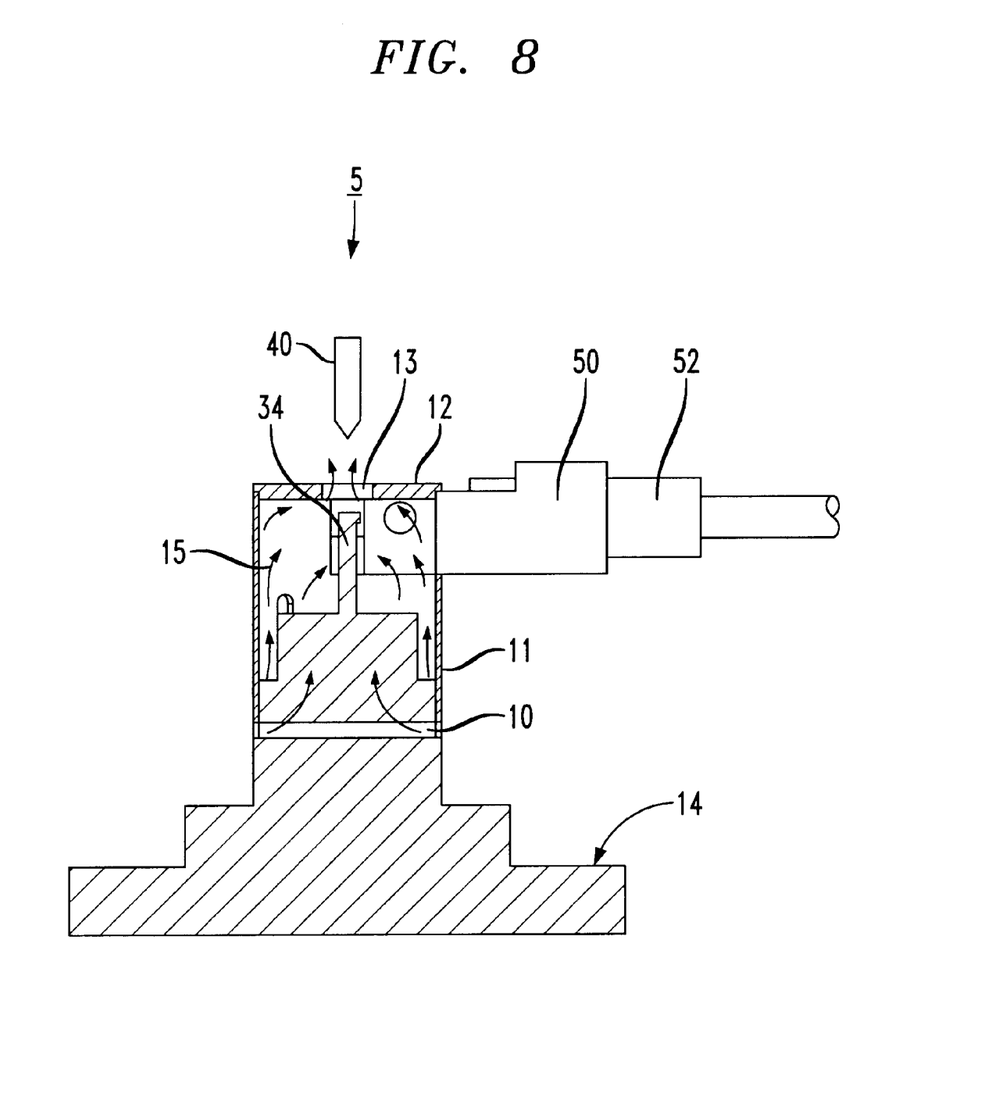
FIG. 8 is a cross-sectional view of the fluxless soldering system shown in FIG. 7, taken along line 8—8 of FIG. 7.
Figure 9:
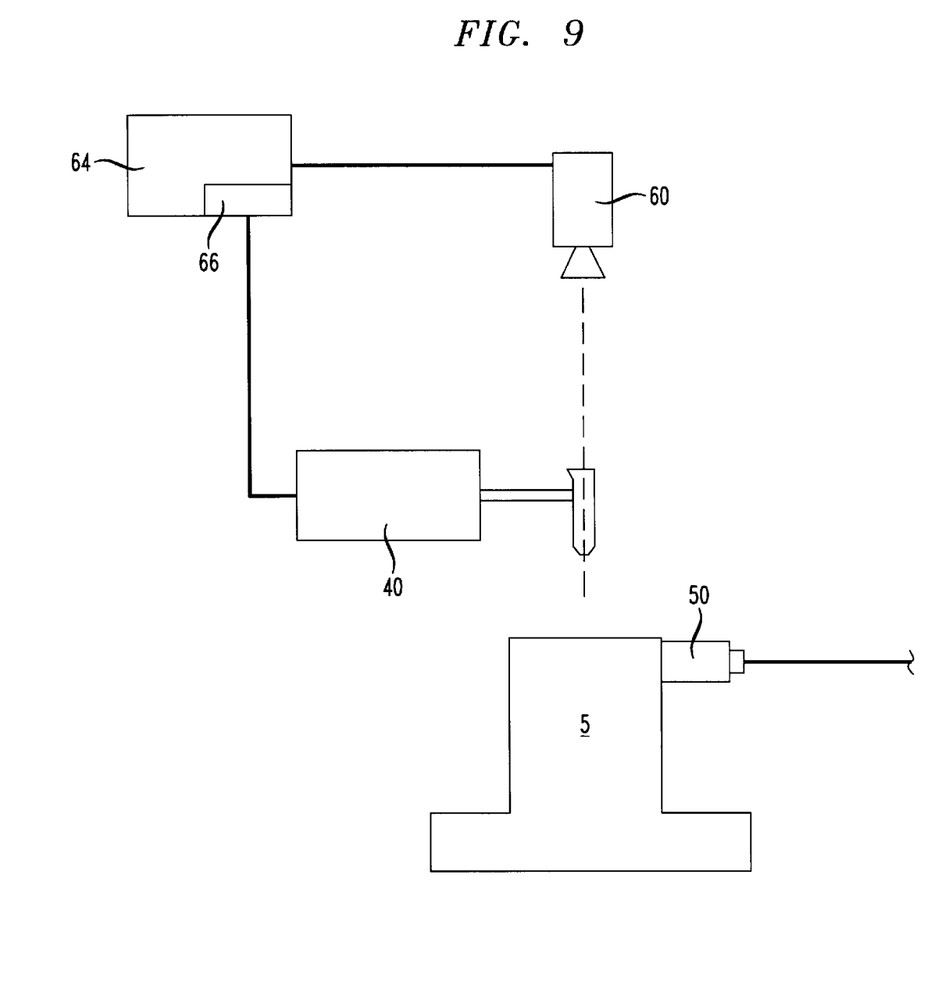
FIG. 9. is a block diagram of the fluxless soldering system shown in FIGS. 5–8, integrated into an automated assembly system.

FIG. 9 shows a block diagram of the fluxless soldering system, integrated into an automated assembly system. The automated system includes a camera 60, which is positioned to view the interior cavity of the soldering system 5. The camera 30 is coupled to a computer 64 having automated vision software 66. The computer 64 is also coupled to a vacuum positioning tool 40. The automated vision software 66 uses data received from camera 60 to control and manipulate the vacuum positioning tool. The vacuum tool 40 can be articulated so that the tool 40 can be inserted into the cavity of the soldering system 5, to place and align component parts in the system 5, or, the vacuum tool 40 can be retracted from the cavity for unobstructed viewing by camera 30.

Advantageously, the oxygen free cavity allows the formation of a solder joint between component parts without the use of fluxes and or mechanical scrubbing, while the inert gas-rich environment prevents the formation of additional oxides on the solder joint.

The dual purpose chimney 13 (i.e., access port and gas vent) permits a continuous flow of inert gas to system cavity 15, so that an inert gas-rich environment is maintained even as component parts are removed from and placed in the system, thereby allowing for a continuous automated production environment.

In addition, the cavity lighting provided by integrated optics holder 50 permits visual inspection of the cavity (e.g., by an external camera using automated vision software), to ensure accurate alignment of component parts in the presence of a "shield" gas environment. The vision software may be integrated with robotic arms to pick and place components in the cavity in a quick, accurate, and repeatable manner. Thus, the invention provides a method for automated, fluxless soldering, resulting in the rapid formation of high quality solder joints using automated assembly equipment.

While this invention has been described with respect to particular embodiments thereof it is not limited thereto. The scope of the invention includes numerous other forms and modifications of the exemplary embodiments which may be made by those skilled in the art. The appended claims should be construed to cover all such forms and modifications that are within the true spirit and scope and range of equivalents of the present invention.

We claim:

1. A method for performing fluxless soldering comprising the steps of:

supplying inert gas into an enclosure, to form an inert gas-rich environment within said enclosure;

illuminating the enclosure;

placing a first component in an abutting relationship with a second component in said enclosure via an access port provided in said enclosure;

heating one of the first and second components to a temperature sufficient to reflow solder between said first and second components; and allowing purge gases to exit from the enclosure through the access port.

2. The method as recited in claim 1 wherein the step of supplying the inert gas into the enclosure includes providing an oxygen-free environment in said enclosure.

3. The method as recited in claim 1 wherein the method includes preventing oxide from forming on the solder during the heating process.

4. The method as recited in claim 1 wherein said enclosure is included in an automated assembly system.

5. The method as recited in claim 1 wherein said inert gas is selected from the group consisting of nitrogen, helium and argon.

6. The method as recited in claim 1 wherein the step of heating one of the first and second components to a temperature sufficient to reflow solder between said first and second components comprises providing energy to a heating stage provided in said enclosure.

7. The method of claim 1 wherein the step of illuminating the enclosure comprises transmitting light into said enclosure from an external light source.

\* \* \* \* \*

UNITED STATES PATENT AND TRADEMARK OFFICE
CERTIFICATE OF CORRECTION

PATENT NO.    : 6,193,135 B1
DATED         : February 27, 2001
INVENTOR(S)   : Lu Fang, Brian Dale Potteiger, Dominic Paul Rinaudo, and Frederick Arthur Yeagle It is certified that error appears in the above-identified patent and that said Letters Patent is hereby corrected as shown below:

<u>Title page,</u>
[75] Inventors: delete "Brian Dale Pottelger" and insert therefor -- Brian Dale Potteiger --.

Signed and Sealed this

Twenty-fifth Day of September, 2001

Attest:

NICHOLAS P. GODICI
Attesting Officer
Acting Director of the United States Patent and Trademark Office